(12) United States Patent  
Leterrier et al.

(10) Patent No.: US 8,220,031 B2
(45) Date of Patent: Jul. 10, 2012

(54) SECURE TIME/DATE VIRTUALIZATION (75) Inventors: Guillaume Leterrier, Nuremberg (DE); Jerome Laurent Azema, Villeneuve-Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 1315 days.

(21) Appl. No.: 11/770,173

(22) Filed: Jun. 28, 2007

(65) Prior Publication Data

US 2008/0276298 A1  Nov. 6, 2008

(30) Foreign Application Priority Data

May 1, 2007 (EP) .................................. 07290547

(51) Int. Cl.
*G06F 17/30* (2006.01)
(52) U.S. Cl. ............ 726/2; 713/168; 713/178; 713/500; 705/51; 705/52; 705/59

(58) Field of Classification Search ...... 726/2; 713/178, 713/500, 168; 705/51, 52, 59; 714/100
See application file for complete search history.

(56) References Cited

U.S. PATENT DOCUMENTS

| 4,745,836 | A  | * | 5/1988 | Dannenberg ............... 84/610 |
| 5,500,897 | A  | * | 3/1996 | Hartman, Jr. .............. 713/178 |
| 2002/0024967 | A1 | * | 2/2002 | Zaun et al. ................ 370/429 |
| 2003/0120939 | A1 | * | 6/2003 | Hughes et al. ............. 713/191 |
| 2003/0126086 | A1 | * | 7/2003 | Safadi ....................... 705/51 |
| 2003/0126446 | A1 | * | 7/2003 | Debiez et al. ............. 713/178 |
| 2005/0010838 | A1 | * | 1/2005 | Davies et al. ............. 714/100 |

* cited by examiner

*Primary Examiner* — Thanhnga B Truong
(74) *Attorney, Agent, or Firm* — Ronald O. Neerings; Wade James Brady, III; Frederick J. Telecky, Jr.

(57) ABSTRACT

A system is provided that includes a processor and a system memory coupled to the processor, the system memory stores at least one application for execution by the processor. The system also includes logic coupled to the processor, the logic providing a secure time reference. The processor selectively accesses the secure time reference to generate a virtual time reference for the at least one application.

7 Claims, 5 Drawing Sheets

SECURE TIME/DATE VIRTUALIZATION

CROSS-REFERENCE TO RELATED APPLICATION

The present application claims priority to EP Application No. 07290547.4, filed on May 1, 2007, hereby incorporated herein by reference.

BACKGROUND

Time/date generators are used in electronic systems for various reasons. For example, a computer or mobile device may simply display a clock and/or a calendar for a user. Also, some applications such as a Digital Rights Management (DRM) agent may rely on the time/date generator to determine when user rights to access a particular file or program begins and/or expires. As an example, a user may purchase rights to view a downloaded video for a limited time (e.g., minutes, hours, days). The DRM agent would enable the user to view the video until the time/date generator indicates that the limited time has expired. In some electronic systems, a user is able to manipulate the time/date generator or falsify information provided by the time/date generator, thereby circumventing the limited time restrictions for a file or program. Improving the security of time/date generators is therefore important. Also, enabling a user to manipulate time/date information for some applications, but not other applications is important.

SUMMARY

In at least some embodiments, a system comprises a processor and a system memory coupled to the processor. The system memory stores at least one application for execution by the processor. The system further comprises logic coupled to the processor, the logic providing a secure time reference. The processor selectively accesses the secure time reference to generate a virtual time reference for the at least one application.

In at least some embodiments, a method comprises generating a secure time reference and a validity indicator for the secure time reference. If the validity indicator is authenticated, the method further comprises generating a virtual time reference based on the secure time reference.

In at least some embodiments, a system comprises means for generating a secure time reference and a validity indicator for the secure time reference. The system further comprises means for generating a plurality of independent virtual time references based on the secure time reference.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Also, the term "virtual time/date" or "virtual time reference" refers to a time/date that is derived from a time/date generator, but is not the time/date generator's value. For example, a virtual time/date can be represented by a time/date generator value plus an offset. Also, the term "secure time/date" or "secure time reference" refers to a time/date that is not changeable or that is only changeable by a trusted authority.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the disclosure provide electronic devices having a secure time/date source. For example, the secure time/date source may only be accessible via a secure interface and/or via an authentication process. After the secure time/date source is initiated or reinitiated, at least one virtual time/date function can be generated based on a secure time/date source value plus an offset. In some embodiments, the validity of the secure time/date source is authenticated in order to generate or update each virtual time/date function.

Figure 1:
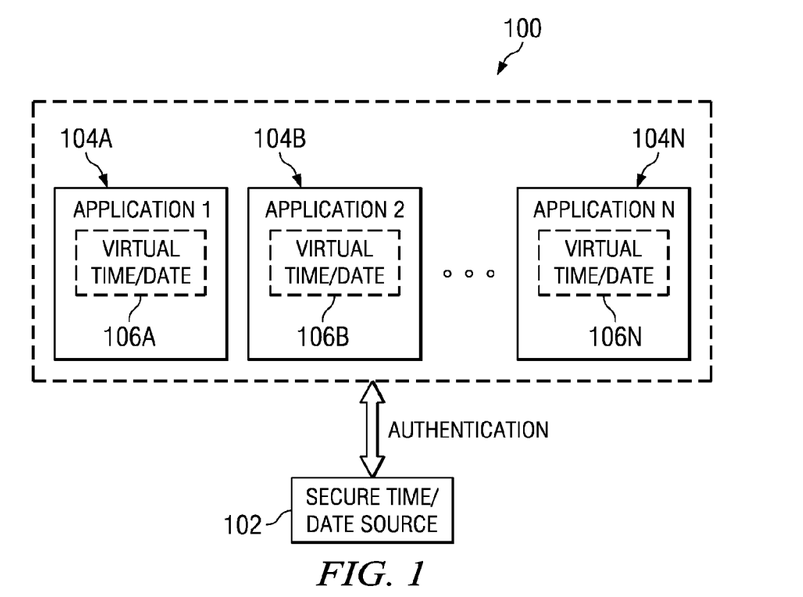
FIG. 1 illustrates a system in accordance with embodiments of the disclosure.

FIG. 1 shows a system 100 in accordance with embodiments of the disclosure. As shown, the system 100 comprises a secure time/date source 102. In at least some embodiments, the secure time/date source 102 comprises logic of an integrated circuit. The secure time/date source 102 provides, for example, a real-time clock or an incrementing counter of time units such as seconds. In FIG. 1, a plurality of applications 104A-104N, each respectively having a virtual time/date function 106A-106N, are able to access the secure time/date source 102. In other words, the applications 104A-104N are able to generate and/or update the virtual time/date functions 106A-106N based on information from the secure time/date source 102. The virtual time/date functions 106A-106N can be independently generated and updated.

In some embodiments, each of the applications 104A-104N participates in an authentication prior to rely on a time/date value provided by the secure time/date source 102. As an example, each of the applications 104A-104N may selectively read a validity indicator provided by the secure time/date source 102. If a given application is reading a validity indicator for the first time, the given application stores the validity indicator (or a corresponding value). The given application can also compute and store an offset value that represents the difference between a virtual time/date for the given application and a time/date value from the secure time/date source 102. If the given application previously stored a validity indicator, then the given application may compare the most recent validity indicator with the stored validity indicator. If the validity indicators match, the given application updates a corresponding virtual time/date based on the stored offset value. If the validity indicators do not match or if there is not a stored validity indicator and offset value, the given application stores the most recent validity indicator and offset value, then resets the virtual time/date for the given application. If subsequent updates are to be made to the virtual time/date, the given application repeats the process of reading the validity indicator and, if the validity indicators match, then updating the virtual time/date based on the stored offset value. If the validity indicators do not match, a new validity indicator and offset value are stored and the virtual time/date is reset.

In at least some embodiments, the validity indicator from the secure time/date source 102 is read whenever an application 104A-104N is created or whenever an application's virtual time/date 106A-106N is set or changed. Also, the offset value can be computed and stored whenever an application 104A-104N is created or whenever an application's virtual time/date 106A-106N is set or changed. As needed, each of the applications 104A-104N compute a current virtual time/date value by comparing the validity indicators and, if authentication is successful, using the stored offset value to compute a current virtual time/date value. If the validity indicators match, the offset value does not need to be re-computed.

In at least some embodiments, the components of the system 100 are part of a single electronic device. In alternative embodiments, the components of the system 100 are spread throughout different devices. For example, the secure time/date source 102 could be located in one device and the applications 104A-104N could be spread throughout a plurality of devices. In such case, some of the applications 104A-104N could still be located on the same device as the secure time/date source 102. Also, some of the applications 104A-104N could operate a plurality of virtual time/date functions rather than one. The system 100 enables the applications 104A-104N to generate and update the virtual time/date functions 106A-106N without being able to manipulate the secure/time date source 102 (i.e., the applications 104A-104N can read, but cannot manipulate the validity indicator nor the time/date value of the secure time/date source 102). In some embodiments, at least one of the applications 104A-104N is a Digital Rights Management (DRM) agent that relies on the secure time/date source 102 and a virtual time/date to determine when user rights to access a particular file or program begins and/or expires.

Figure 2:
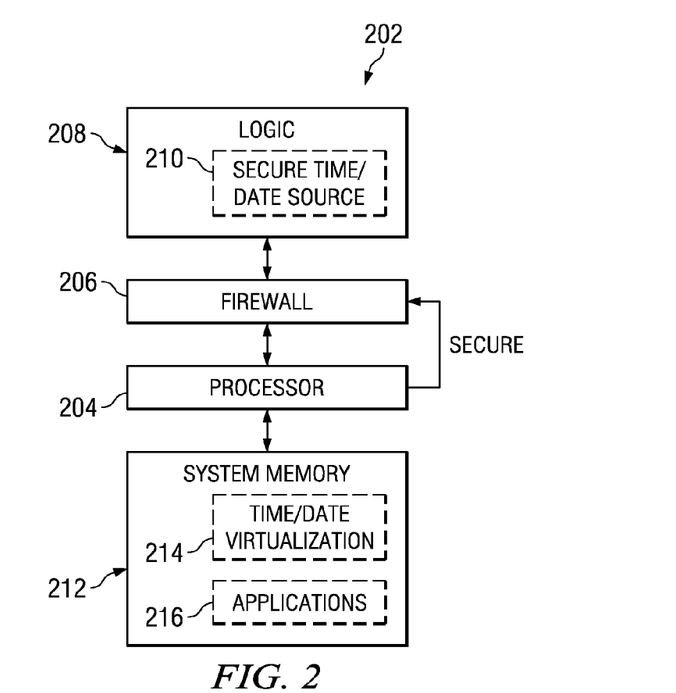
FIG. 2 illustrates an electronic device in accordance with embodiments of the disclosure.

FIG. 2 illustrates an electronic device 202 in accordance with embodiments of the disclosure. As shown, the electronic device 202 comprises a processor 204 coupled to a system memory 212. The system memory 212 stores time/date virtualization instructions 214 and applications 216 for execution by the processor 204. When executed, the time/date virtualization instructions 214 cause the processor 204 to selectively read information from logic 208 having a secure time/date source 210. The logic 208 could be an integrated circuit or other logic that provides a real-time clock or an incrementing counter of time units such as seconds. The information read from the logic 208 comprises a validity indicator and a time/date value which can be used by the time/date virtualization instructions 214 to update or reset a virtual time/date. In at least some embodiments, the time/date virtualization instructions 214 could generate and update a plurality of different virtual time/dates. For example, each or some of the applications 216 could implement a set of time/date virtualization instructions 214 to generate and update a virtual time/date.

As an example, the time/date virtualization instructions 214 may cause the processor 204 to selectively read a validity indicator provided by the secure time/date source 210. In some embodiments, the validity indicator is part of the secure time/date source 210 and is automatically updated when certain conditions are met (e.g., loss of power to the secure time/date source 210). If a given application is reading a validity indicator for the first time, the time/date virtualization instructions 214 causes the given application to store the validity indicator (or a corresponding value). The time/date virtualization instructions 214 also cause the processor 204 to compute and store an offset value for the given application. The offset value represents the difference between a virtual time/date for the given application and a time/date value from the secure time/date source 210. If the given application previously stored a validity indicator, then the time/date virtualization instructions 214 compare the most recent validity indicator with the stored validity indicator. If the validity indicators match, the time/date virtualization instructions 214 cause the processor 204 to update a virtual time/date based for the given application based on the stored offset value. If the validity indicators do not match or if there is not a stored validity indicator and offset value, the time/date virtualization instructions 214 cause the most recent validity indicator to be stored and an offset value to be computed. The virtual time/date for the given application is then reset. If subsequent updates are to be made to the virtual time/date, the time/date virtualization instructions 214 repeat the process of reading the validity indicator and, if the validity indicators match, then updating the virtual time/date based on the stored offset value. If the validity indicators do not match, a new validity indicator and offset value are stored and the virtual time/date is reset.

In at least some embodiments, the time/date virtualization instructions 214 cause the validity indicator from the secure time/date source 210 to be read whenever an application 216 is created or whenever an application's virtual time/date is set or changed. Also, the time/date virtualization instructions 214 cause the offset value to be computed and stored whenever an application 216 is created or whenever an application's virtual time/date is set or changed. As needed, the time/date virtualization instructions 214 compute a current virtual time/date value by comparing the validity indicators and, if authentication is successful, using the stored offset value to compute a current virtual time/date value. If the validity indicators match, the offset value does not need to be re-computed.

When executed, one or more of the applications 216 selectively rely on a virtual time/date to perform a function. In at least some embodiments, one or more of the applications 216 correspond to a DRM agent that relies on a virtual time/date, generated and updated by the time/date virtualization instructions 214, to determine when user rights to access a particular file or program begins and/or expires. Authentication of the validity indicator ensures the time/date value provided by the secure time/date source 210 214 is accurate and free from manipulation.

As shown, a firewall 206 or other protection could be placed between the processor 204 and the logic 208 to prevent unauthorized access to the validity indicator or the time/date value stored by the secure time/date source 210. In some embodiments, the firewall 206 selectively permits the processor 204 to write to the logic 208. For example, if the logic 208 loses power, the time/date value of the secure time/date source 210 will subsequently be inaccurate (i.e., the real-time clock or the incrementing counter of the secure time/date source 210 would have stopped while the power is off). Therefore, the processor 204 selectively changes the value of the validity indicator, which causes the time/date virtualization instructions 214 to reset any virtual time/dates that are not based on the most recent validity indicator. Although the firewall 206 is shown as being separate from the secure time/date source 210, some embodiments could combine these components. In either case, the processor 204 is able to assert a "secure" control signal to the firewall 206 that enables the processor 204 to change the validity indicator. The "secure" control signal corresponds to an encrypted signal or to a signal provided during a secure mode of the electronic device 202.

Figure 3:
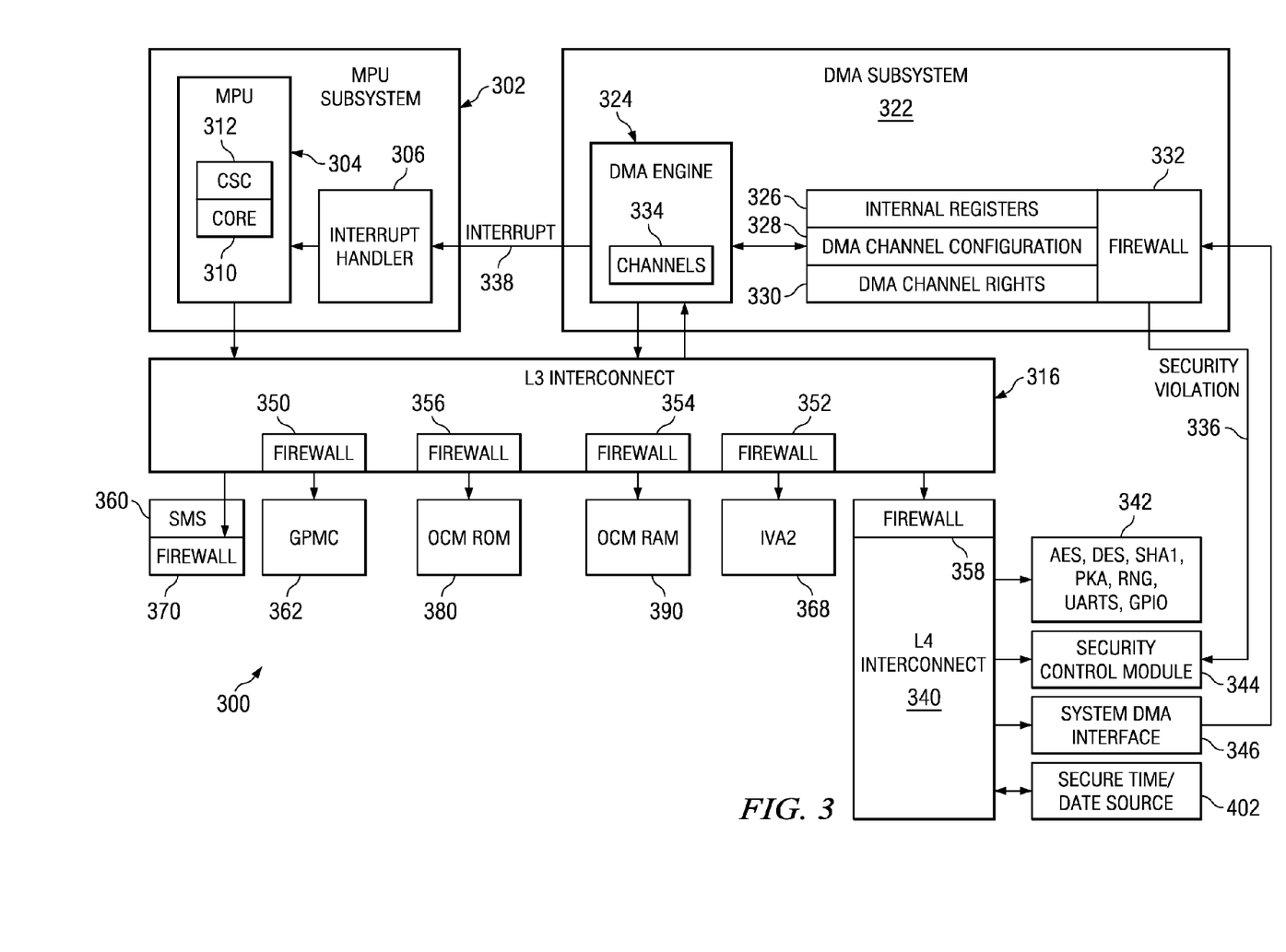
FIG. 3 illustrates another electronic device in accordance with embodiments of the disclosure.

FIG. 3 illustrates another electronic device 300 in accordance with embodiments of the disclosure. The electronic device 300 is representative of devices having a public mode and a secure mode. In at least some embodiments, the electronic device 300 corresponds to a portable device such as a cellular telephone, a personal digital assistant (PDA), a text messaging system, or a device that combines the functionality of a messaging system, a personal digital assistant and a cellular telephone.

The Electronic Device

As shown in FIG. 3, the electronic device 300 includes a multiprocessing unit (MPU) subsystem 302 having a MPU 304 coupled to an interrupt handler 306. The MPU 304 includes a processor core 310 that executes programs and a core security controller (CSC) 312, which aids the MPU 304 in entering a secure mode for execution of secure applications on the core 310. The core 310 may be any processor suitable for integration into a system on a chip (SoC), such as the ARM 1136 series of processors. In other embodiments, the core 310 may be a processor that includes some or all of the functionality of the core security controller 312 as described herein, such as the ARM 1176 series of processors. The ARM 1136 and 1176 technology may be obtained from ARM Holdings plc of Cambridge, United Kingdom, and/or ARM, Inc. of Austin, Tex., USA.

As shown, the MPU subsystem 302 couples to a DMA subsystem 322 that enables memory accesses between DMA-compatible components ("targets") of the system 300. The DMA subsystem 322 has a DMA engine 324 with programmable DMA channels 334. The DMA subsystem 322 also has internal registers 326 such as DMA channel configuration registers 328 and DMA channel rights registers 330. The DMA channel configuration registers 328 are implemented to configure the DMA channels 334 as read channels or as read/write channels during DMA requests. The DMA channel rights registers 330 control the access rights of each DMA channel 334. These access rights could be based, for example, on the security rules and/or hardware constraints of the system's hardware security architecture (e.g., as determined by interconnect qualifiers). As used herein, the term "interconnect qualifier" or "qualifier" is intended to mean a signal embedded in an access (e.g., an Open Core Protocol (OCP) access). The qualifier reflects the state of the component that initiated the access at the time the access was initiated.

The DMA subsystem 322 also may comprise DMA status registers, source address registers, destination address registers, DMA length registers, DMA control registers, or other registers (not shown for convenience). In some embodiments, the DMA subsystem 322 is interconnected to DMA-compatible components (i.e., source locations or destination locations) via a hardware security architecture such as an L3 interconnect 316 having firewalls 350, 352, 354, and 356 and an L4 interconnection having a firewall 358. The DMA subsystem 322 also comprises a configuration firewall 332 that allows and restricts the usage of DMA channel qualifiers as will later be described. Although the L3 interconnect 316 and the L4 interconnect 340 described herein are implemented in some embodiments, alternative embodiments may implement other existing or future interconnect architectures.

In at least some embodiments, the DMA-compatible components mentioned previously comprise a SDRAM Memory Scheduler (SMS) component 360 having a firewall 370, a General Purpose Memory Controller (GPMC) component 362, an on-chip read-only memory (ROM) 364, an on-chip random access memory (RAM) 366, and an Image Video Accelerator (IVA2) component 368. In alternative embodiments, additional components, fewer components or different DMA-compatible components may be included.

The electronic device 300 further comprises an L4 interconnect core component 342 having logic that supports functions such as the Advanced Encryption Standard (AES), the Data Encryption Standard (DES), the Secure Hash Algorithm 1 (SHA1), Public Key Authentication (PKA), Random Number Generators (RNG), Universal Asynchronous Receiver/Transmitters (UARTs), and General Purpose Input/Outputs (GPIOs). In alternative embodiments, the L4 interconnect core component 342 may support additional functions, fewer functions or different functions.

In at least some embodiments, a secure time/date source 402 couples to the L4 interconnect 340 to provide the validity indicator and the time/date value from the secure time/date source 402. The electronic device 300 further comprises a control module 344 that interfaces the L4 interconnect 340 to the DMA subsystem 322. As shown, the firewall 332 of the DMA subsystem 322 is configured to assert a security violation signal 336 to the security control module 344 if a security violation occurs. Among other functions performed, the security control module 344 selectively enables writes to be performed to the secure time/date source 402. These write operations can be used to change the validity indicator or the time/date value of the secure time/date source 402.

To comply with the system's hardware security architecture, components of the electronic device support usage of interconnect "qualifiers" that determine access rights to different protected memory spaces. Enforcement of the access rights associated with the interconnect qualifiers is based on firewalls such as the firewalls 350, 352, 354, 356, 358 and 332. In at least some embodiments, interconnect qualifiers such as "MReqType", "MReqPrivilege", "MReqDebug" and "MReqSecure" are used. Table 1 shows a definition and description of these qualifiers.

TABLE 1

| Qualifier | Definition | Description |
|---|---|---|
| MReqType | 0 Data mode<br>1 Instruction fetch mode | Indicates if an associated access request is an data access or an instruction (Opcode) fetch |
| MReqPrivilege | 0 Public mode access<br>1 Privilege mode Access | Indicates if an associated access request is made in a public access mode or a privilege mode. |
| MReqDebug | 0 Functional mode<br>1 Debug mode | Indicates if an associated access request is made in a functional mode or a debug mode |
| MReqSecure | 0 Normal transaction mode<br>1 Secure transaction mode | Indicates if an associated access request is part of a normal transaction or a secure transaction |

If present, the MReqType qualifier shown in Table 1 comprises a logic "0" or "1". If the MReqType qualifier=0, an access request (channel configuration request) associated with the MReqType qualifier is part of a data access mode that transfers data to a non-executable memory space. If the MReqType qualifier=1, an access request associated with the MReqType qualifier is part of an instruction (Opcode) access mode that transfers data to an executable memory space.

If present, the MReqPrivilege qualifier comprises a logic "0" or "1". If the MReqPrivilege qualifier=0, an access request (channel configuration request) associated with the MreqPrivilege qualifier is a user mode access. If the MReqPrivilege qualifier=1, an access request associated with the MReqPrivilege qualifier is a privilege mode access. For example, in embodiments that implement ARM components, a plurality of privilege mode accesses are possible such as a "supervisor" mode access, a "system" access, an "interrupt request" (IRQ) access, a "fast interrupt request" (FIQ) access, an "abort" access, an "undefined" access or a "monitor" access. A privilege mode access enables operations that are not available to user mode accesses.

If present, the MReqDebug qualifier comprises a logic "0" or "1". If the MReqDebug qualifier=0, the access request (channel configuration request) associated with the MReqDebug qualifier is a functional mode access. If the MReqDebug qualifier=1, the access request associated with the MReqDebug qualifier is a debug mode access. In at least some embodiments, the functional mode involves executing instructions using a processor and the debug mode involves executing instructions using an emulator.

If present, the MReqSecure qualifier comprises a logic "0" or "1". If the MReqSecure qualifier=0, an access request (channel configuration request) associated with the MReqSecure qualifier is a normal transaction mode access. If the MReqSecure qualifier=1, an access request associated with the MReqSecure qualifier is a secure transaction mode access. Qualifiers may be used together or separately to enable a variety of access rights. For more information regarding the use and enforcement of interconnect qualifiers, reference may be made to European Pat. App. No. EU 05 291 479.3, filed on Jul. 7, 2005 and entitled "Method and System For a Multi-Sharing Security Firewall", which is herein incorporated by reference.

While one or more of the previously described qualifiers are implemented in some embodiments, other embodiments may implement different qualifiers. The qualifiers MReqType, MReqPrivilege, MReqDebug and MReqSecure are simply used for convenience in describing embodiments that implement ARM components. However, these qualifiers should also be understood as being applicable to any system with different modes and different security levels. Although other embodiments are possible, the secure time/date source 402 can be configured to recognize MReqSecure qualifier operations while other qualifier operations would be discarded or would trigger a security violation.

In the embodiment of FIG. 3, the firewalls 350, 352, 354, 356, 358 and 332 are configured to allow or restrict certain qualifiers. For example, if the MPU 304 attempts to perform a DMA channel configuration that is not allowed (e.g., some channel configurations may be "locked"), in-band errors are sent back to the initiator that accessed the firewall 332 (e.g., the MPU 104) and out-band errors (e.g., the security violation signal 336) are generated to the control module 344 and later converted into an MPU interrupt 338. As used herein, "in-band errors" refer to errors that are embedded in a response transaction to the initiator. For example, a response transaction may include status information such as an "OK" indicator or a "FAIL" indicator that is returned to the initiator. As used herein, "out-band errors" refer to errors that are out of the initiator execution flow. For example, the firewalls may generate error signals that are outside the initiator execution flow. The out-band errors can be used to update status registers and/or to cause an interrupt such as the MPU interrupt 338 previously mentioned. The MPU interrupt 338 can be used to notify a user of the system 300, to disable one or more functions of the system 300, or to perform some other action in response to a security violation. In a similar manner, if the MPU 104 or another initiator attempts to improperly access the secure time/date source 402, the violation can be detected and an MPU interrupt 338 can be used to notify a user of the system 300, to disable one or more functions of the system 300, or to perform some other action in response to the security violation. For more information regarding detecting and responding to security violations, reference may be made to U.S. patent application Ser. No. 10/961,344, filed on Oct. 8, 2004 and entitled "System and Method of Identifying and Preventing Security Violations Within a Computing System", which is herein incorporated by reference.

Figure 4:
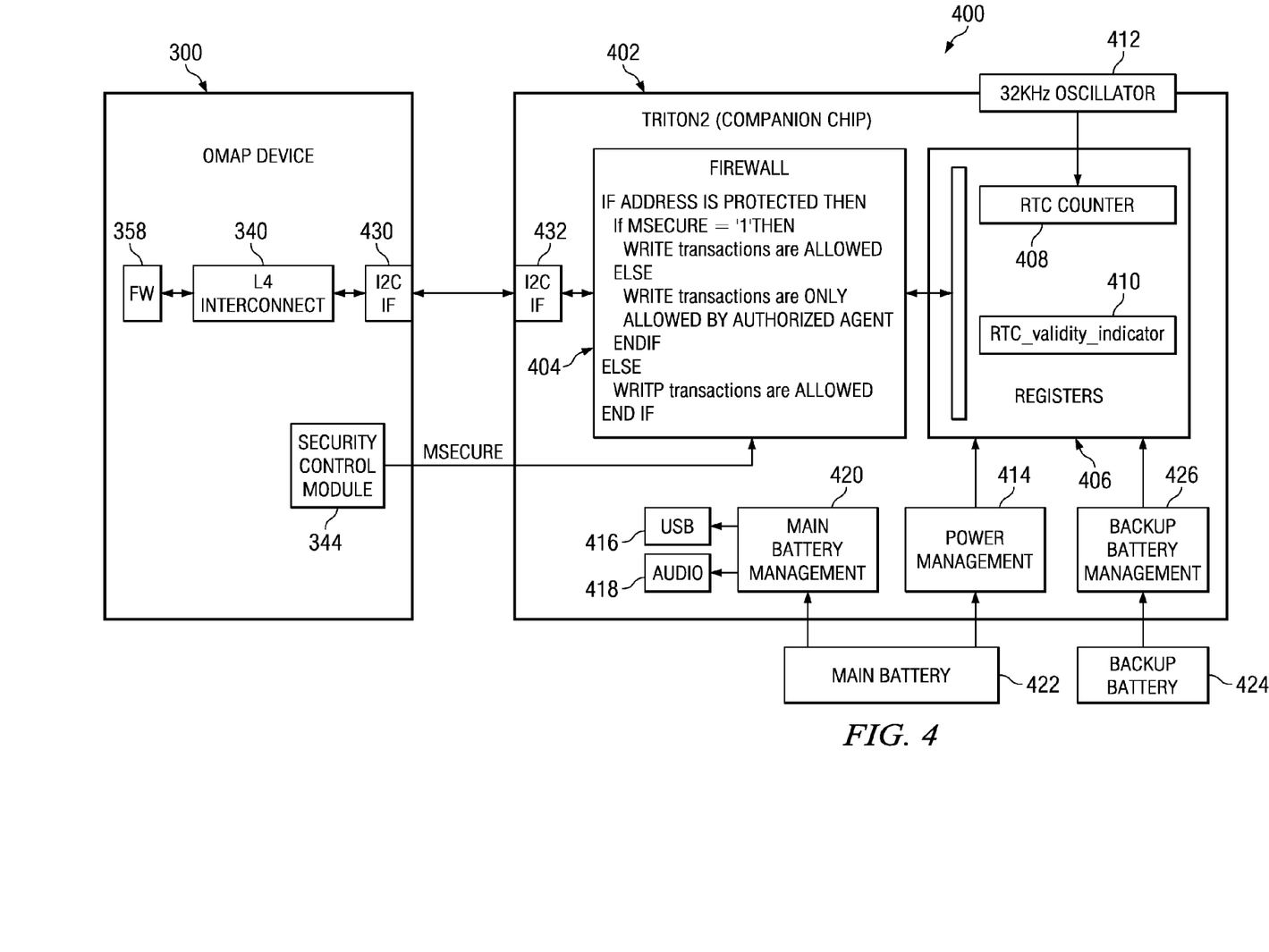
FIG. 4 illustrates secure time/date logic in accordance with the embodiment of FIG. 3.

FIG. 4 illustrates secure time/date logic 402 in accordance with the embodiment of FIG. 3. Although not required, the secure time/date logic 402 may be part of an integrated circuit sometimes referred to as the "TRITON2", which is a companion chip for some Open Multimedia Applications Platform (OMAP) devices. In some embodiments, the secure time/date logic 402 couples to the L4 interconnect 340 of the electronic device 300 via an I2C interface 430. The security control module 344 of the electronic device 300 selectively asserts an MSECURE control signal that corresponds to MReqSecure qualifier previously discussed. While the MSECURE control signal is asserted, writes can be performed to the secure time/date logic 402. As an example, the MSECURE control signal can be asserted during a boot process that follows a power loss to enable the MPU 302 or other initiator to change the validity indicator or the time/date value for the secure time/date logic 402. In some embodiments, changing the time/date value of secure time/date logic 402 is unnecessary since the offset value is being used. Once the validity indicator or time/date value has been updated, the MSECURE control signal is de-asserted to prevent unauthorized changes to the secure time/date logic 402.

As shown in FIG. 4, the secure time/date logic 402 comprises a firewall 404 coupled to registers 406. In at least some embodiments, the registers 406 include a real-time clock (RTC) counter register 408 and a RTC validity indicator register 410. The RTC counter register 408 stores an incrementing value based on an oscillator 312. The oscillator could operate at a frequency of 32 KHz although other frequencies are possible. The RTC validity indicator register 410 stores a validity indicator that is adjustable every time the secure time/date logic 402 loses power or is otherwise interrupted. By comparing validity indicators, a determination can be made regarding the accuracy of the RTC counter register value. In other words, the RTC counter register value should always be incrementing in order for an accurate offset value to be determined. Also, an accurate offset value can be computed to determine a virtual time/date. The offset value represents the difference between the a virtual time/date and a time/date value from the secure time/date counter 408

As an example, if the RTC counter register 408 has a value of 1000 for a given read operation and a value of 2500 for a subsequent read operation, then 1500 time units have passed between the read operations. Also, if an offset value of 500 time units is computed as the difference between a given virtual time/date and the time/date value from the secure time/date counter register 408, then this offset value can be added to changes in the counter value whenever the given virtual time/date is updated. The actual amount of time that changes for the virtual time/date depends on the time units being tracked by the RTC counter register 408. As an example, if the time units being tracked by the RTC counter register 408 correspond to seconds, then 1500 seconds passed between the two read operations. A virtual time/date can thus be updated by tracking the value of the secure time/date counter 408 and by adding an appropriate offset value.

To ensure the secure time/date counter register 408 is accurate, the value stored in the RTC validity indicator register 410 is changed whenever there is an interruption to the counting process of the RTC counter register 408. As an example, if the RTC counter register 408 has a value of 1000 for a given read operation and a value of 2500 for a subsequent read operation, 1500 time units passed between the read operations. However, if the RTC validity indicator register value has changed, then an assumption is made that the counter value does not account for an interruption that occurred in the counting process of the RTC counter register 408. Accordingly, the counter value is no longer accurate and any virtual time/date that relies on the RTC counter register value should be reset.

The firewall 404 of FIG. 4 selectively enables write operations to the RTC counter register 408 or to the RTC validity indicator register 410. For example, the MSECURE control signal can be asserted during a boot process that follows a power loss to enable the RTC validity indicator register value to be changed. Once the RTC validity indicator register value has been changed, the MSECURE control signal can be de-asserted to prevent further changes. Thus, the RTC validity indicator register value would not be changed until a subsequent interruption of the RTC counter register 408 occurs. The RTC validity indicator value could be provided by a random number generator or an incrementing counter. In some embodiments, the RTC counter register value could also be reset while the MSECURE control signal is asserted, which would necessitate resetting any virtual time/dates based on the RTC counter register value.

In at least some embodiments, the secure time/date logic 402 comprises additional components. For example, the embodiment of FIG. 4 includes power management logic 414 that couples to the registers 406. The power management logic 414 receives power from a main battery 422 and manages power to the registers 406. The registers 406 could also be powered by a backup battery 424 via backup battery management logic 426 that couples to the registers 406. In such case, power from both the main battery 422 and the backup battery 424 would have to be cut off to interrupt the RTC counter.

In at least some embodiments, the secure time/date logic 402 also supports an audio component 418 and a Universal Serial Bus (USB) component 416. The audio component 418 and the USB component 416 receive power from the main battery 422 via main battery management logic 420.

Figure 5:
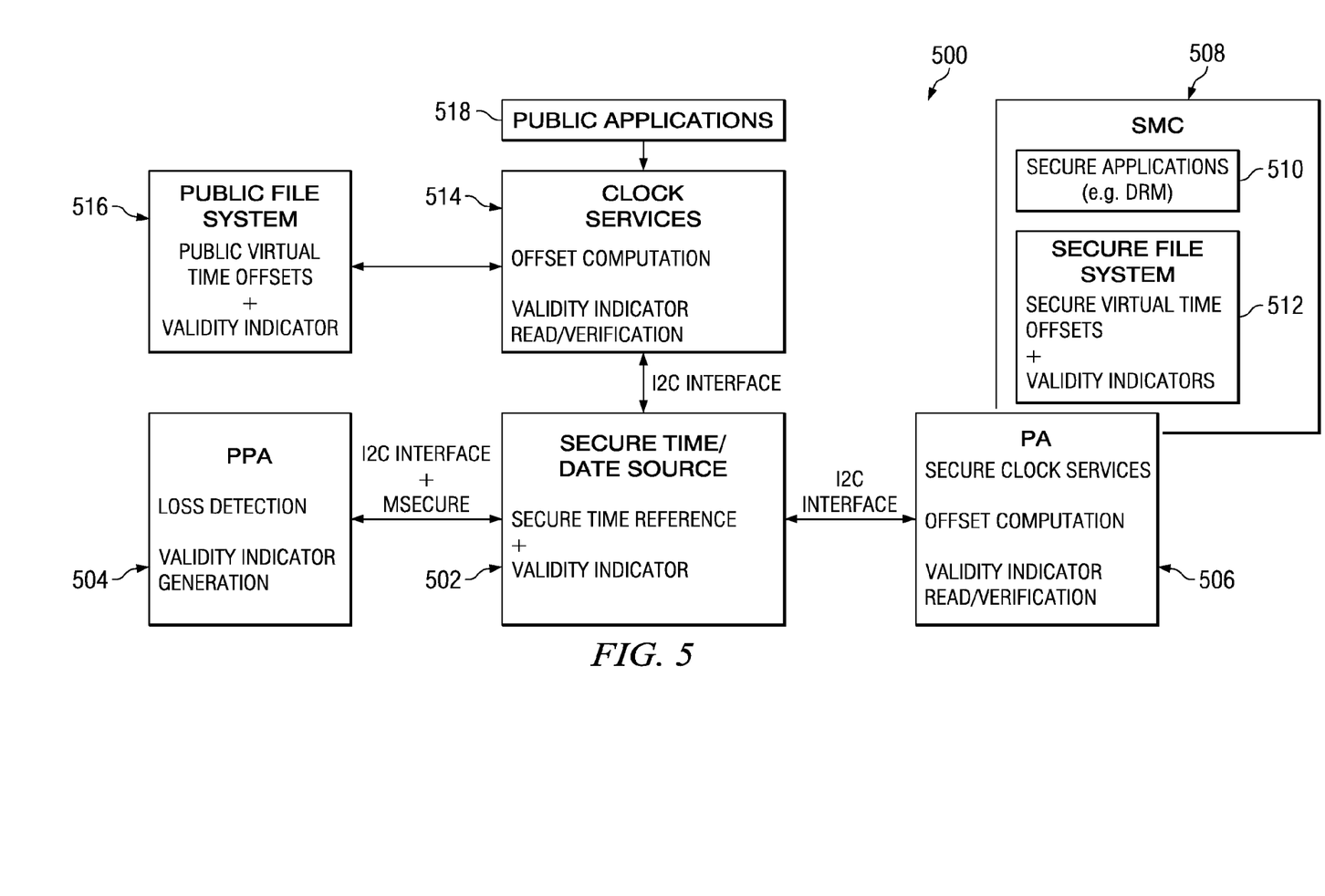
FIG. 5 illustrates a software architecture in accordance with embodiments of the disclosure.

FIG. 5 illustrates a software architecture 500 in accordance with embodiments of the disclosure. The software architecture 500 comprises a secure time/date source application 502 that maintains a secure time reference and a validity indicator. The secure time/date source application 502 may be part of an OMAP companion chip (e.g., the TRITON2 chip) or other logic. The secure time reference and the validity indicator are made available to a clock services application 514, which tracks changes to the secure time reference and also computes an offset value between the secure time reference and a virtual time reference. The clock services application 514 also authenticates the validity indicator. If the validity indicator is successfully authenticated, the secure time reference and the offset value can be used to generate or update a virtual time/date for public applications 518. If the RTC validity indicator is not successfully authenticated, the secure time reference is invalid and any virtual time/date based on the secure time reference is reset. As needed, offset values and validity indicators can be stored in a public file system 516 and accessed by the clock services application 514 or the public applications 518. In at least some embodiments, the clock services application 514, the public applications 518 and the public file system 516 are executed using a public domain or public mode of the electronic device 300.

The secure time reference and the validity indicator can also be made available to a secure clock services application 506, which tracks changes to the secure time reference and also computes an offset value between the secure time reference and a virtual time reference. The secure clock services application 506 also authenticates the validity indicator. If the validity indicator is successfully authenticated, the secure time reference and the offset value can be used to generate or update a virtual time/date for secure applications 510 (sometimes referred to as a "protected applications" or PAs). A DRM agent is an example of a secure application. If the validity indicator is not successfully authenticated, the secure time reference is considered to be invalid and any virtual time/date based on the secure time reference is reset. As needed, offset values and validity indicators can be stored in a secure file system 512 and accessed by the secure clock services application 506 or the secure applications 510. In some embodiments, the secure file system 512 and the secure applications 518 are part of a secure middleware component 508. The clock services application 514, the public applications 518 and the public file system 516 may be executed using a secure domain or secure mode of the electronic device 300.

The software architecture 500 also comprises, a primary protected application (PPA) 504 configured to detect interruptions to the secure time reference. For example, the PPA 504 may detect when power to the secure time/date source 502 has been cut off. The PPA 504 also selectively generates a new validity indicator. A new validity indicator can be written to the secure time/date source 502 while the MSECURE control signal is asserted. As previously described, this procedure could occur during a boot process that follows a power loss. Changing the validity indicator causes virtual time/date values relied upon by the public applications 518 and the secure applications 510 to be reset. In at least some embodiments, the PPA 504 is executed using a secure domain or secure mode of the electronic device 300. As shown, I2C interfaces could support communications between the secure time/date source 502 and the PPA 504, the clock services 514, and the secure clock services 506.

Figure 6:
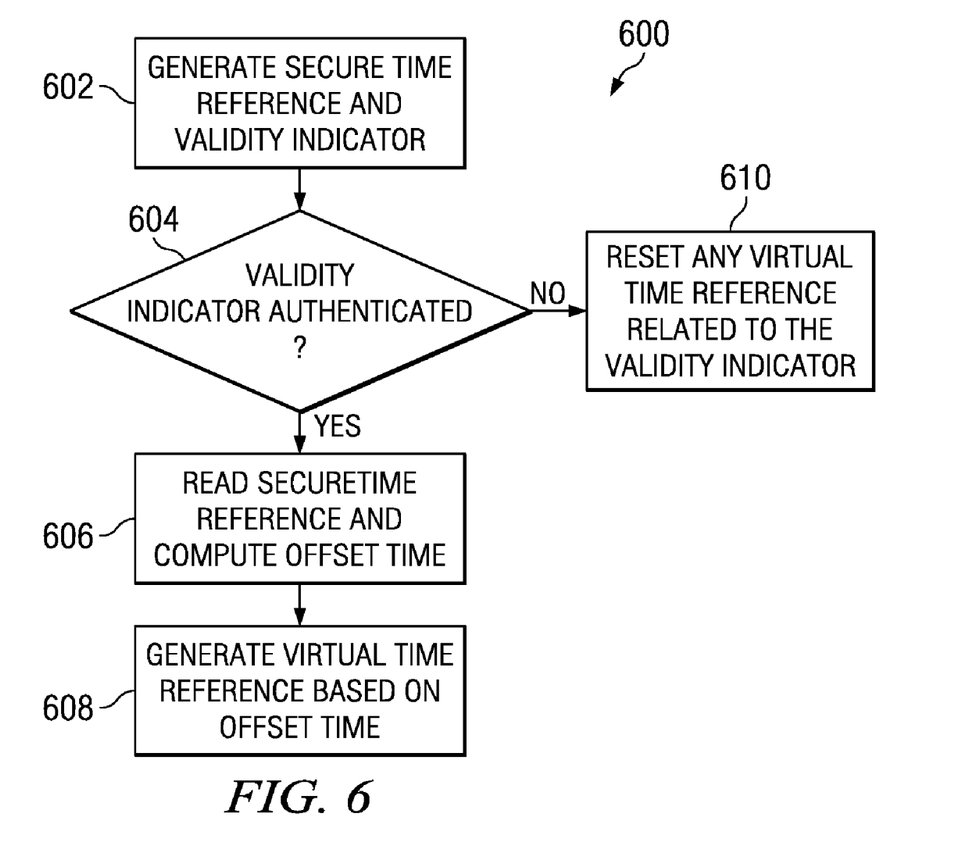
FIG. 6 illustrates a method in accordance with embodiments of the disclosure.

FIG. 6 illustrates a method 600 in accordance with embodiments of the disclosure. The method 600 comprises generating a secure time reference and a validity indicator (block 602). If the validity indicator is not authenticated (determination block 604), the method 600 resets any virtual time references related to the validity indicator (block 610) and returns to block 602. If the validity indicator is authenticated (determination block 604), the secure time reference is read and an offset value is computed (block 606). A virtual time reference can then be generated based on the secure time reference and the offset value (block 608). The method 600 can be repeated as needed and is useful for supporting DRM agents or other applications that need access to a secure time reference.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a processor;
a system memory coupled to the processor, the system memory stores a plurality of applications for execution by the processor; and
logic coupled to the processor, the logic providing a secure time reference,
wherein the processor accesses the secure time reference to generate a plurality of independent virtual time references for the plurality of applications, at least one of the virtual time references for one of the applications being different than one other virtual time reference for another application,
wherein the logic provides a validity indicator for the secure time reference, and
wherein, if the validity indicator related to the secure time reference fails authentication, the virtual time reference is reset.

2. The system of claim 1 wherein the at least one application comprises a Digital Rights Management (DRM) agent that relies on the virtual time reference to determine when user rights to access a particular file or program of the system expires.

3. The system of claim 1 wherein the logic comprises a real-time clock.

4. The system of claim 1 wherein the logic comprises an incrementing counter of time units.

5. The system of claim 1 wherein, if the validity indicator is successfully authenticated, the virtual time reference is updated based on the secure time reference.

6. The system of claim 1 wherein, if the secure time reference is interrupted, the validity indicator is changed using a secure mode of the system.

7. The system of claim 1 wherein the validity indicator is automatically changed during a boot process that follows a power loss to the logic.

* * * * *